US011879355B1

(12) United States Patent
Yamarthi et al.

(10) Patent No.: US 11,879,355 B1
(45) Date of Patent: Jan. 23, 2024

(54) AIRFOIL ASSEMBLY WITH AN INTERNAL REINFORCEMENT STRUCTURE

(71) Applicant: General Electric Company, Schenectady, NY (US)

(72) Inventors: David Raju Yamarthi, Bengaluru (IN); Vasanth Kumar Balaramudu, Bengaluru (IN); Vishnu Vardhan Venkata Tatiparthi, Bengaluru (IN); Paul Mathew, Bengaluru (IN); Douglas Lorrimer Armstrong, Needham, MA (US); Gary Willard Bryant, Jr., Loveland, OH (US); Nuthi Srinivas, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/881,771

(22) Filed: Aug. 5, 2022

(51) Int. Cl.
*F01D 5/14* (2006.01)
*F01D 5/28* (2006.01)

(52) U.S. Cl.
CPC ............. *F01D 5/147* (2013.01); *F01D 5/282* (2013.01); *F05D 2240/30* (2013.01); *F05D 2250/25* (2013.01); *F05D 2300/6034* (2013.01); *F05D 2300/612* (2013.01)

(58) Field of Classification Search
CPC ............................. F01D 5/147; F05D 2250/25
See application file for complete search history.

(56) References Cited

U.S. PATENT DOCUMENTS

| | | | | |
|---|---|---|---|---|
| 2,248,221 | A | 7/1941 | Dornier | |
| 2,458,975 | A | 1/1949 | Brady | |
| 5,269,657 | A | 12/1993 | Garfinkle | |
| 5,279,892 | A | 1/1994 | Baldwin et al. | |
| 8,038,408 | B2 | 10/2011 | McMillan | |
| 8,251,660 | B1 * | 8/2012 | Liang | F01D 5/187 415/115 |
| 9,957,972 | B2 * | 5/2018 | Foster | F01D 5/282 |
| 2016/0032939 | A1 | 2/2016 | Anderson et al. | |
| 2016/0222793 | A1 * | 8/2016 | Snyder | F01D 9/065 |
| 2019/0145269 | A1 | 5/2019 | Campbell | |

FOREIGN PATENT DOCUMENTS

| | | | |
|---|---|---|---|
| FR | 591117 | A | 6/1925 |
| FR | 719239 | A | 2/1932 |

* cited by examiner

*Primary Examiner* — Michael L Sehn
(74) *Attorney, Agent, or Firm* — Dority & Manning, P.A.

(57) ABSTRACT

An airfoil assembly and a method of manufacturing the same are provided, the airfoil assembly defining a span axis, a root end, and a tip end. The airfoil assembly includes a reinforcement structure comprising a first helical support structure wrapped around the span axis between the root end and the tip end and a second helical support structure wrapped around the span axis between the root end and the tip end; a polymeric matrix material positioned at least partially around the reinforcement structure; and an outer skin positioned around the reinforcement structure and the polymeric matrix material.

20 Claims, 5 Drawing Sheets

AIRFOIL ASSEMBLY WITH AN INTERNAL REINFORCEMENT STRUCTURE

FIELD

The present disclosure relates to gas turbine engines, and more particularly, to airfoil assemblies and methods for manufacturing the same.

BACKGROUND

A gas turbine engine typically includes a fan assembly and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator. In a turbofan engine, the fan assembly generally includes a fan having a plurality of airfoils or fan blades extending radially outwardly from a central hub and/or a disk. During certain operations, the fan blades provide an airflow into the turbomachine and over the turbomachine to generate thrust.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

DETAILED DESCRIPTION

Figure 1:
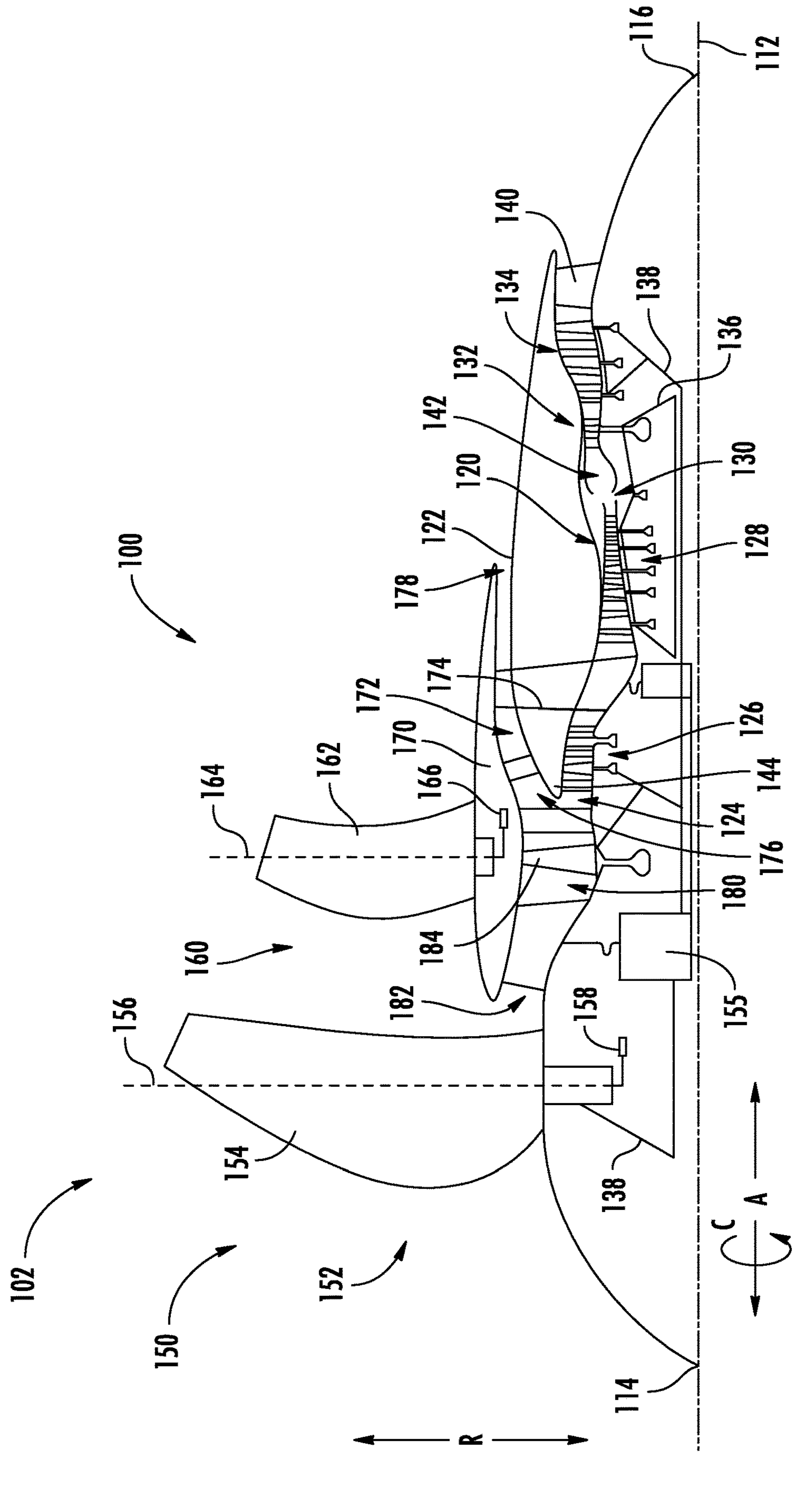
FIG. 1 is a schematic cross-sectional view of a gas turbine engine in accordance with an exemplary embodiment of the present disclosure.
Figure 2:
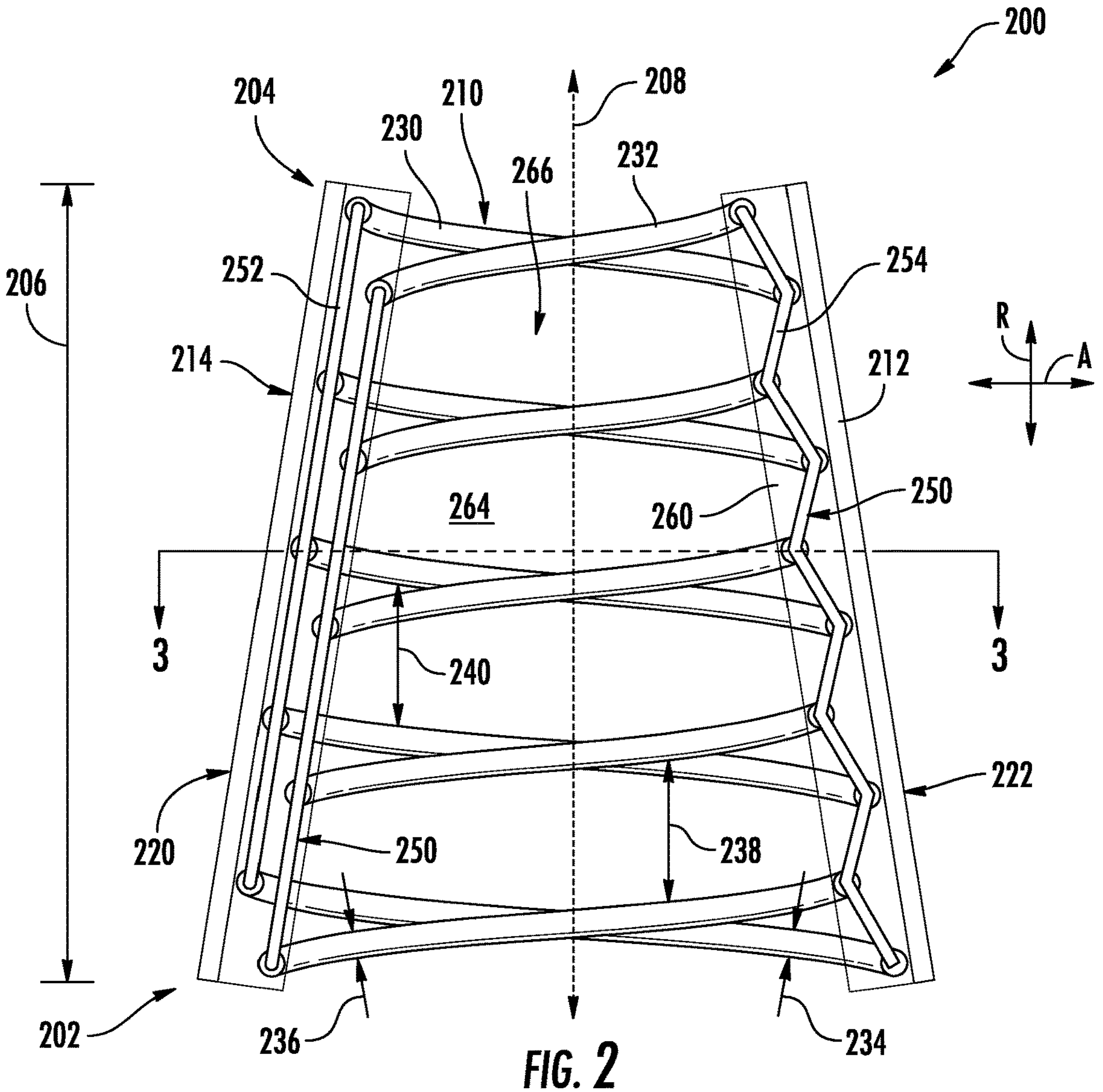
FIG. 2 is a schematic cross-sectional view of an airfoil assembly that may be used with the exemplary gas turbine engine of FIG. 1 in accordance with an exemplary embodiment of the present disclosure.
Figure 3:
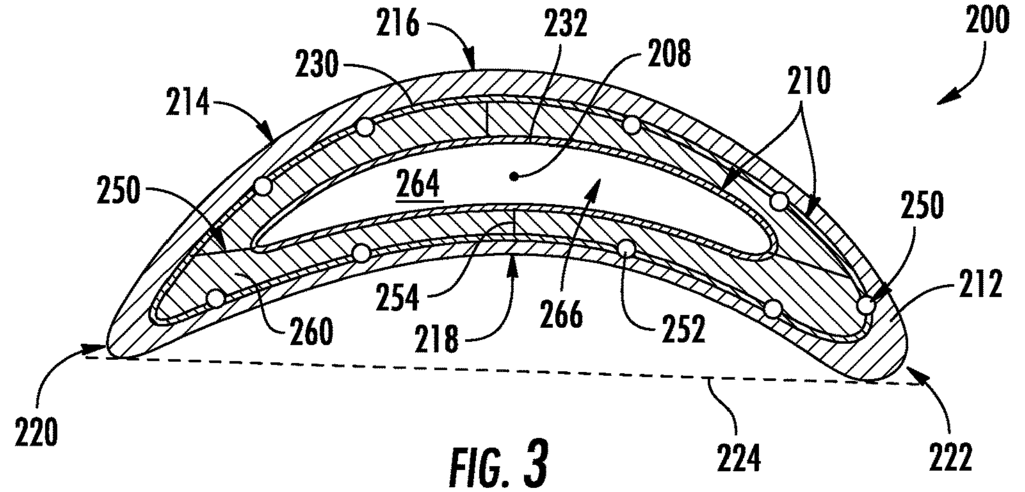
FIG. 3 is another schematic cross-sectional view of the exemplary airfoil assembly of FIG. 2 taken along Line 3-3 in FIG. 2 in accordance with an exemplary embodiment of the present disclosure.
Figure 4:
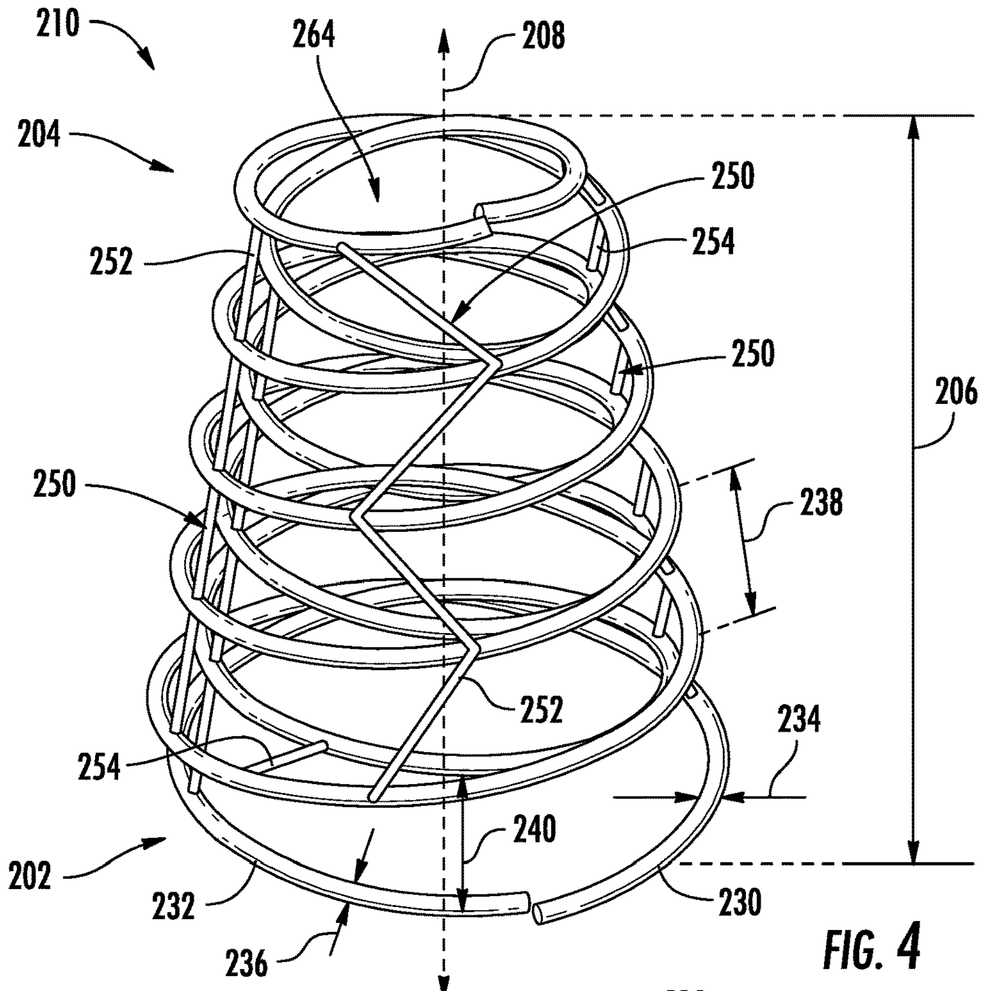
FIG. 4 is a partial perspective view of the exemplary airfoil assembly of FIG. 2 in accordance with an exemplary embodiment of the present disclosure.
Figure 5:
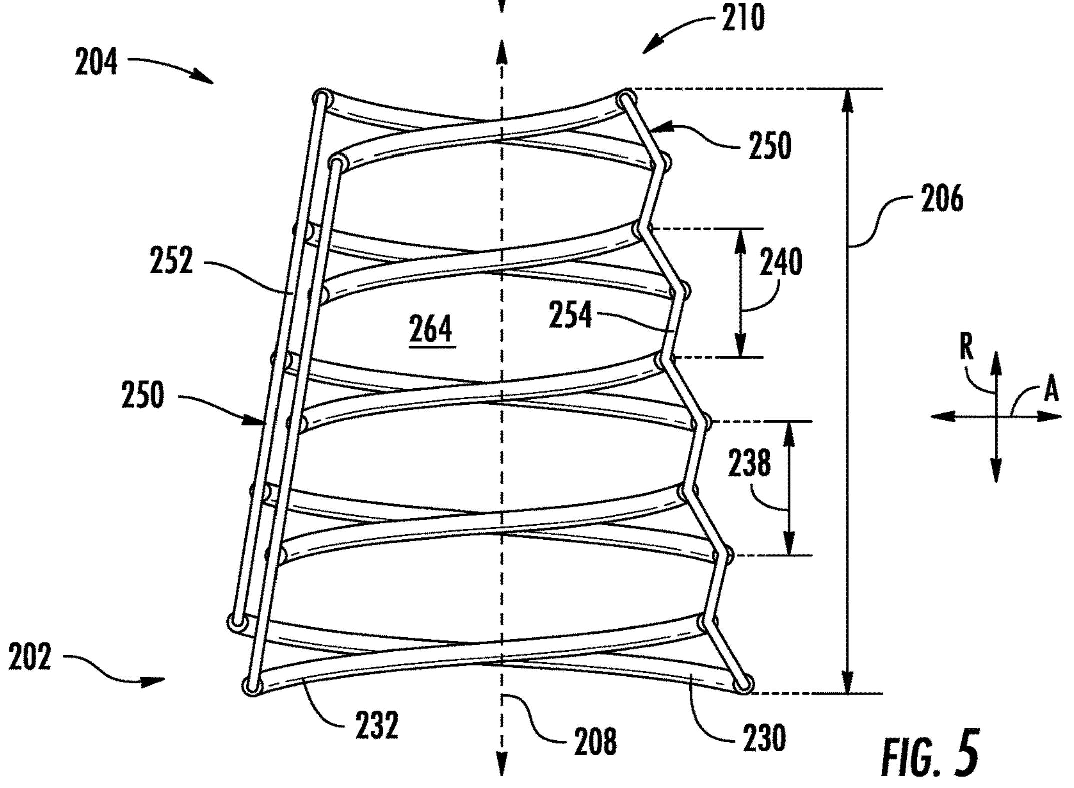
FIG. 5 is a partial perspective cross-sectional view of the exemplary airfoil assembly of FIG. 2 in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the disclosure, not limitation of the disclosure. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the term "first stream" or "free stream" refers to a stream that flows outside of the engine inlet and over a fan, which is unducted. Furthermore, the first stream is a stream of air that is free stream air. As used herein, the term "second stream" refers to a stream that flows through the engine inlet and the ducted fan and also travels through the core inlet and the core duct. As used herein, the term "third stream" or "mid-fan stream" refers to a stream that flows through an engine inlet and a ducted fan but does not travel through a core inlet and a core duct. Furthermore, the third stream is a stream of air that takes inlet air as opposed to free stream air. The third stream goes through at least one stage of the turbomachine, e.g., the ducted fan.

Thus, a third stream means a non-primary air stream capable of increasing fluid energy to produce a minority of total propulsion system thrust. A pressure ratio of the third stream is higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments, these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions. In other exemplary embodiments, it is contemplated that the airflow through the third stream may contribute greater than 50% of the total engine thrust (and at least, e.g., 2% of the total engine thrust) at an engine operating condition. In other exemplary embodiments, it is contemplated that the airflow through the third stream may contribute approximately 50% of the total engine thrust (and at least, e.g., 2% of the total engine thrust) at an engine operating condition.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

Certain modern fan blades are formed of composite material(s) to reduce a weight of the fan blades. However, aircraft engine components, such as fan blades, nacelles, guide vanes, etc., used in jet engine applications are susceptible to foreign object impact damage or ingestion events, such as an ice ingestion or bird strike. Moreover, fan blades formed from composite material(s) may be more susceptible to damage in such events, e.g., by blade fracture, component delamination, bending or deformation damage, or other forms of blade damage. Accordingly, improved airfoil designs for addressing one or more of the above-mentioned problems would be useful. More specifically, an airfoil assembly with a lightweight and structurally sound design that can withstand foreign object ingestion events would be particularly beneficial.

Accordingly, aspects of the present subject matter are directed to an airfoil assembly and methods of manufacturing the same for improved blade performance, durability, etc. For example, the airfoil assembly may include a reinforcement structure that includes two or more helical support structures that wrap around a span axis of the airfoil assembly. These helical support structures may be concentric and may be formed to have different wire sizes, different materials, different helix pitches, etc. In addition, the reinforcement structure may include a plurality of struts mechanically coupling the first helical support structure and the second helical support structure and a polymeric matrix material positioned at least partially around the reinforcement structure. An outer skin may be positioned around the reinforcement structure and the polymeric matrix material to form the airfoil assembly.

Such a composite blade construction may facilitate improved blade durability, thus enabling fan blade weight reduction while minimizing the potential for blade deformation, debonding, failure, or other operational degradation. In addition, local blade stiffnesses may be modified and tailored by selectively designing and positioning the various helixes, connector struts, or other portions of the reinforcement structure. Moreover, such constructions may improve fan blade stability to meet aeromechanical requirements, may result in an improvement in dissipation of shock wave energy due to impact loads, may provide better control of blade untwist behavior to improve the operability margins, may improve fan blade durability, etc.

Referring now to FIG. 1, a schematic cross-sectional view of a gas turbine engine 100 is provided according to an example embodiment of the present disclosure. Particularly, FIG. 1 provides an engine having a rotor assembly with a single stage of unducted rotor blades. In such a manner, the rotor assembly may be referred to herein as an "unducted fan," or the entire gas turbine engine 100 may be referred to as an "unducted engine," or an engine having an open rotor propulsion system 102. In addition, the engine of FIG. 1 includes a mid-fan stream extending from the compressor section to a rotor assembly flowpath over the turbomachine, as will be explained in more detail below. It is also contemplated that, in other exemplary embodiments, the present disclosure is compatible with an engine having a duct around the unducted fan. It is also contemplated that, in other exemplary embodiments, the present disclosure is compatible with a turbofan engine having a third stream as described herein.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120, also referred to as a core of the gas turbine engine 100, and a rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air and produce high energy combustion products.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a core or turbomachine exhaust nozzle 140.

Accordingly, the turbomachine 120 defines a working gas flowpath 142 that extends between the core inlet 124 and the turbomachine exhaust nozzle 140. The working gas flowpath 142 is an annular flowpath positioned generally inward of the core cowl 122 along the radial direction R and extends through the turbomachine 120. The working gas flowpath 142 may also be referred to herein as a second stream.

The fan section 150 includes a fan 152, which is the primary fan in this example embodiment. For the depicted embodiment of FIG. 1, the fan 152 is an open rotor or unducted fan 152. As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. However, for the embodiments shown in FIG. 1, the fan 152 is coupled with the LP shaft 138 via a speed reduction gearbox 155, e.g., in an indirect-drive or geared-drive configuration.

Moreover, the fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch the fan blades 154 about their respective central blade axis 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about their respective central blade axis 164, e.g., in unison with one another. One or more actuators 166 are provided to facilitate such rotation and therefore may be used to change a pitch of the fan guide vane 162 about their respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., the HP compressor 128 and combustion section for the embodiment depicted). The ducted fan 184 is shown at about the same axial location as the fan blade 154, and radially inward of the fan blade 154. The ducted fan 184, for the embodiment depicted, is driven by the low pressure turbine 134 (e.g., coupled to the LP shaft 138).

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan flowpath 172. The fan flowpath 172 may be referred to as a third stream of the gas turbine engine 100.

Incoming air may enter through the fan flowpath 172 through a fan duct inlet 176 and may exit through a fan exhaust nozzle 178 to produce propulsive thrust. The fan flowpath 172 is an annular duct positioned generally outward of the working gas flowpath 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan flowpath 172 and the working gas flowpath 142 may at least partially co-extend (generally axially) on opposite sides (e.g., opposite radial sides) of the core cowl 122. For example, the fan flowpath 172 and the working gas flowpath 142 may each extend directly from a leading edge 144 of the core cowl 122 and may partially co-extend generally axially on opposite radial sides of the core cowl.

The gas turbine engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the working gas flowpath 142 and the fan flowpath 172 by a splitter or leading edge 144 of the core cowl 122. The inlet duct 180 is wider than the working gas flowpath 142 along the radial direction R. The inlet duct 180 is also wider than the fan flowpath 172 along the radial direction R.

Figure 6:
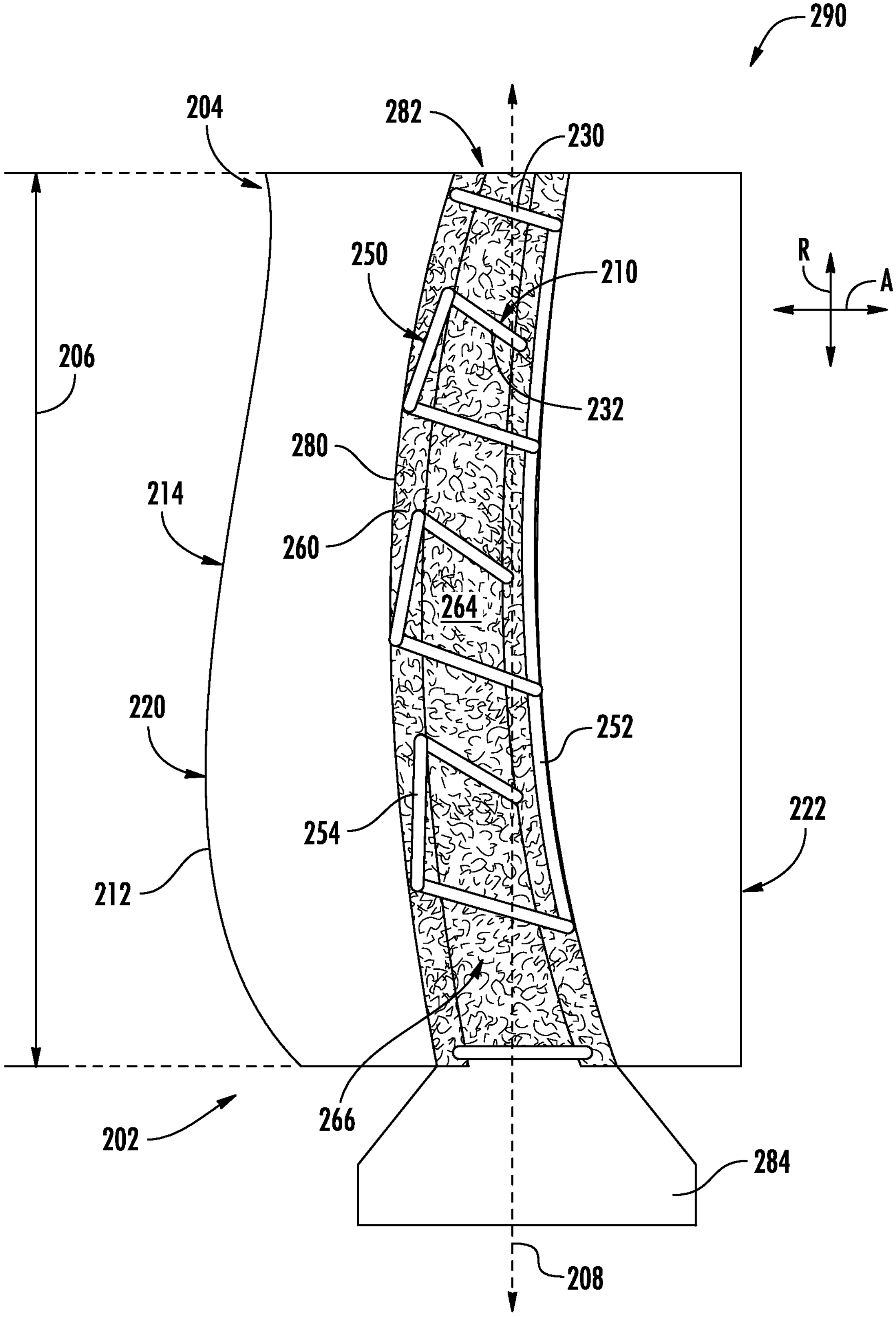
FIG. 6 is a schematic cross-sectional view of an airfoil assembly that may be used with the exemplary gas turbine engine of FIG. 1 in accordance with an exemplary embodiment of the present disclosure.

Referring now generally to FIGS. 2 through 6, airfoil assemblies 200 that may be used in a gas turbine engine will be described according to exemplary embodiments of the present subject matter. Specifically, FIGS. 2 through 5 provide schematic illustrations of an airfoil assembly 200 including reinforcement structure that may be used in gas turbine engine 100, e.g., as fan blade 154 or as fan guide vanes 162. In addition, FIG. 6 provides another exemplary configuration of an airfoil assembly 290, e.g., similar to that which may be used in gas turbine engine 100, e.g., where a central spar includes reinforcement structure, as described in more detail below.

Notably, due to the similarity between embodiments described herein, like reference numerals may be used to refer to the same or similar features among various embodiments. Although airfoil assemblies 200 are described herein as being used with gas turbine engine 100, it should be appreciated that aspects of the present subject matter may be applicable to any suitable blades for any suitable gas turbine engine. Indeed, the exemplary blade constructions and features described herein may be interchangeable among embodiments to generate additional exemplary embodiments. The specific structures illustrated and described herein are only exemplary and are not intended to limit the scope of the present subject matter in any manner.

Referring now specifically to FIGS. 2 through 5, airfoil assembly 200 will be described according to an exemplary embodiment. Notably, it should be appreciated that these drawings may not illustrate all features of airfoil assembly 200 to simplify discussion and clarity of aspects of the present subject matter. For example, as described in more detail below with respect to FIG. 6, airfoil assembly 290 may include various attachment structures, fillers, support structures, etc.

In general, airfoil assembly 200 defines a root end 202 and may extend outward from root end 202 along the radial direction R toward a tip end 204 of airfoil assembly 200, e.g., along a span 206 of airfoil assembly 200. In this regard, span 206 of airfoil assembly 200 may be generally defined as the distance between root end 202 and tip end 204 of airfoil assembly 200 as measured along the radial direction R. In addition, the term "span axis" (identified generally by reference numeral 208) may generally refer to a line or axis that extends through a geometrical center of airfoil assembly 200 at each cross-section taken perpendicular to the radial direction R.

In addition, airfoil assembly 200 includes a reinforcement structure 210 and a blade skin 212 that is generally positioned on or wrapped around reinforcement structure 210 to define an airfoil 214 (e.g., the outer profile of a fan blade or airfoil). Blade skin 212 may be a polymer matrix composite (PMC), epoxy resin, carbon fiber, glass fiber, thermoplastics material, etc. As used herein, the terms "airfoil" and the like may generally refer to the shape or geometry of an outer surface of airfoil assembly 200, e.g., the surface that interacts with the stream of air passing over airfoil assembly 200. In general, airfoil 214 has a suction side 216 and a pressure side 218 extending in the axial direction A between a leading edge 220 (e.g., a forward end of airfoil 214) and a trailing edge 222 (e.g., an aft end of airfoil 214). In addition, a chord line 224 may be generally defined as a line extending between leading edge 220 and trailing edge 222, and the term "chordwise direction" may generally refer to the relative position along chord line 224.

Reinforcement structure 210 will now be described in more detail according to exemplary embodiments of the present subject matter. In general, reinforcement structure 210 may generally include one or more helical support structures. For example, according to the illustrated embodiment, reinforcement structure 210 includes a first helical support structure 230 and a second helical support structure 232, each of which wrap around span axis 208 and extend at least partially between root end 202 and tip end 204 of airfoil assembly 200. As will be explained in more detail below, first helical support structure 230 and second helical support structure 232 may generally provide the primary structural support for airfoil 214 and may generally define the profile of airfoil 214.

As used herein, the term "helical" may be used to generally describe the geometry of first helical support structure 230 and second helical support structure 232. However, it should be appreciated that the present disclosure does not require a perfectly helical structure or a structure that forms a circular cross section. In this regard, the term "helical" may be used generally to refer to any spiral, corkscrew, or similar geometry, e.g., such as any curve that is wrapped around span axis 208 and which would form a straight line or continuous wire if it was unrolled into a single plane. In addition, according to the embodiments illustrated in FIGS. 2 through 6, span axis 208 is illustrated as being substantially straight, but it should be appreciated that span axis 208 may have any suitable curved profile that follows a center of a cross-section of airfoil assembly 200.

Notably, the size, geometry, and orientation of first helical support structure 230 and second helical support structure 232 may be varied as needed to provide airfoil assembly 200 with the desired structural characteristics. In this regard, according to the illustrated embodiment, first helical support structure 230 and second helical support structure 232 are concentric, e.g., sharing a common center which may correspond to span axis 208. In addition, second helical support structure 232 is illustrated as having a smaller footprint and being positioned inside of first helical support structure 230, though other support configurations are possible and within the scope of the present subject matter.

In addition, first helical support structure 230 and second helical support structure 232 may be wrapped in different directions about span axis 208. For example, according to the illustrated embodiment, first helical support structure 230 may be wrapped in a clockwise direction around span axis 208, e.g., when looking down span axis 208 from tip end 204 and toward root end 202. By contrast, second helical support structure 232 may be wrapped in a counterclockwise direction around span axis 208, e.g., when looking down span axis 208 from tip end 204 and toward root end 202. According to alternative embodiments, first helical support structure 230 and second helical support structure 232 may be wrapped in the same direction (e.g., both being wrapped in the clockwise direction).

According to the illustrated embodiment, each of first helical support structure 230 and second helical support structure 232 may be formed from a single elongated piece of wire that is wrapped about span axis 208 in a helical fashion. According to exemplary embodiments, first helical support structure 230 may generally define a first wire diameter 234 and second helical support structure 232 may generally define a second wire diameter 236. It should be appreciated that using the manufacturing techniques described herein, first wire diameter 234 and second wire diameter 236 may be varied as needed throughout reinforcement structure 210 to achieve the desired performance and structural characteristics of airfoil assembly 200. For example, at least one of first wire diameter 234 or second wire diameter 236 may vary along span axis 208. In addition, it should be appreciated that first wire diameter 234 and second wire diameter 236 may be different at any given spanwise location along reinforcement structure 210.

In addition, according to the illustrated embodiment, first helical support structure 230 may generally define a first helix pitch 238 and second helical support structure 232 may define a second helix pitch 240. According to exemplary embodiments, the helix pitches 238, 240 may be varied as needed depending on the application. For example, according to an exemplary embodiment, at least one of first helix pitch 238 or second helix pitch 240 may vary along span axis 208. In this regard, for example, the helix pitches 238, 240 may be smaller where higher blade stresses are experienced and larger where lower blade stresses are experienced.

Referring still generally to FIGS. 2 through 5, reinforcement structure 210 may further include a plurality of struts 250 for mechanically coupling first helical support structure 230 to second helical support structure 232. In this regard, struts 250 are generally structural or mechanical support members that extend between various portions of the helical support structures to improved rigidity, transmit forces, etc. Although exemplary struts 250 are described herein for the example embodiment showing first helical support structure 230 and second helical support structure 232, it should be appreciated that the number, size, and configuration of struts 250 may be varied as needed depending on the application. According to the illustrated embodiment, struts 250 are straight members that extend between two points on helical support structures, though struts could take any other shape according to alternative embodiments.

As shown, the plurality of struts 250 may generally include a plurality of turn connectors 252 that extend between and mechanically couple adjacent turns or passes of a respective helical support structure. In this regard, turn connectors 252 are illustrated on the left side of FIGS. 2, 4, and 5 as connecting adjacent portions of respective helical support structures. In this regard, for example, a first set of turn connectors 252 are illustrated as extending substantially along the radial direction R to couple adjacent passes of first helical support structure 230. Notably, this connection may also help to stabilize or fix the first helix pitch 238. As illustrated, second helical support structure 232 may include similar turn connectors 252.

In addition, according to exemplary embodiments, the plurality of struts 250 may also include a plurality of helix connectors 254 that extend between and mechanically couple two or more helical support structures. In this regard, as best illustrated on the right side of FIGS. 2, 4, and 5, helix connectors 254 may pass substantially along the radial direction R to connect portions, passes, or turns of first helical support structure 230 and second helical support structure 232 that are adjacent to each other.

Although struts 250 are generally illustrated as connecting adjacent portions of first helical support structure 230 and/or second helical support structure 232, it should be appreciated that reinforcement structure 210 may include struts 250 that connect any other suitable portions or regions of the one or more helical support structures for improving the rigidity or blade performance. In this regard, for example, struts 250 may extend in a direction other than the radial direction R or the spanwise direction, e.g., as illustrated for example in the foreground of FIG. 4. According to still other embodiments, struts 250 may be designed to extend along a chordwise direction or along the chord line 224 of airfoil 214. Furthermore, it should be appreciated that the size, thickness, geometry, and spacing of struts 250 may be varied as needed depending on the application. For example, struts 250 may be spaced about a perimeter of first helical support structure 230 and second helical support structure 232.

In general, reinforcement structure 210 and all components therein may be manufactured in any suitable manner in from any suitable materials. For example, first helical support structure 230, second helical support structure 232, and/or struts 250 may include at least one of metal, metal fibers, shape-memory alloys, carbon materials, aramids, functionally graded materials (FGMs), or carbon nano fibers. In addition, it should be appreciated that portions of reinforcement structure 210 may be formed from different materials. In this regard, first helical support structure 230 may be formed from a different material than second helical support structure 232, which may be different than struts 250, etc.

In addition, any suitable manufacturing method may be used for manufacturing reinforcement structure 210. For example, each helical support structure 230, 232 may be separately formed and struts 250 may be mechanically fastened, welded, or otherwise joined to solidify reinforcement structure 210. According to still other embodiments, reinforcement structure 210 may be additively manufactured as a single, integral piece. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to plastics, pure metals, metal alloys (e.g., such as nickel, chrome, titanium, iron, stainless steel, etc.), epoxy, composites, or any other suitable polymer, ceramic, or metal materials. These materials are examples of materials suitable for use in the additive manufacturing processes described herein and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

According to exemplary embodiments of the present subject matter, airfoil assembly 200 may further include a polymeric matrix material 260 that is positioned at least partially around reinforcement structure 210. In general, polymeric matrix material 260 may be generally configured for solidifying or binding together various components of reinforcement structure 210 also providing a bond between reinforcement structure 210 and blade skin 212. Polymeric matrix material 260 may be generally formed from any suitable material and may be applied to reinforcement structure 210 in any suitable manner. Blade skin 212 may be wrapped around or positioned on an outer surface of reinforcement structure 210 and/or polymeric matrix material 260. According to exemplary embodiments the present subject matter, polymeric matrix material 260 may fully enclose or encapsulate reinforcement structure 210 and provide a uniform structure or surface for receiving blade skin 212.

In general, polymeric matrix material 260 may include any suitable number, type, and combination of materials that serve to bond or join together portions of reinforcement structure 210 and/or blade skin 212. For example, polymeric matrix material 260 may include a polymer slurry with one or more structural reinforcement fibers embedded therein for improved rigidity. In addition, it should be appreciated that according to exemplary embodiments, polymeric matrix material 260 may include or be coated with one or more adhesives for improved engagement with reinforcement structure 210 and/or blade skin 212. For example, adhesives may include epoxy, polyurethane, or any other kind adhesive known to those of ordinary skill in the art. In addition, according to example embodiments, polymeric matrix material 260 may include a stronger particulate at leading edge 220 to provide impact resistance.

According to the illustrated embodiment, airfoil assembly 200 may further generally define one or more inner cavities 264. According to exemplary embodiments, the one or more inner cavities 264 may be filled with a foam 266 and may be generally configured for improving the rigidity without unnecessarily increasing a weight of airfoil assembly 200. According to exemplary embodiments, foam 266 may generally include at least one of polymethacrylimide (PMI) foam or a urethane foam. In addition, or alternatively, foam 266 may also include cast syntactic or expanding syntactic foams, e.g., glass, carbon, or phenolic micro balloons cast in resin. Other suitable foams are possible and within the scope of the present subject matter. According to exemplary embodiments, foam 266 may include any suitable number and type of foam reinforcement structures.

Notably, in the embodiment illustrated in FIGS. 2 through 5, airfoil assembly 200 includes reinforcement structure 210, polymeric matrix material 260, blade skin 212, and foam 266 filling the one or more inner cavities 264 of airfoil assembly 200. In this manner, airfoil assembly 200 generally represents the complete airfoil, such as fan blades 154 and/or fan guide vanes 162. However, according to alternative embodiments, these constructions may be used to form other portions of airfoil assembly 200. For example, as described in more detail below and as illustrated in FIG. 6, an airfoil assembly 290 is provided including a similar construction using reinforcement structure 210 polymeric matrix material 260, and an outer skin 280 may be used to form a central spar 282 of an airfoil assembly 200.

In this regard, as shown in FIG. 6, airfoil 290 may include a central spar 282 that extends outward along a radial direction R, e.g., which corresponds to radial direction R when airfoil assembly 290 is installed in gas turbine engine 100. More specifically, as illustrated, central spar 282 may include a blade attachment structure 284, e.g., illustrated as a dovetail, for securing airfoil assembly 290 to a rotating central hub (e.g., or mechanically coupling airfoil assemblies 290 to actuators 158). Notably, conventional central spars are formed from solid, rigid material in order to withstand the forces exerted on airfoil assembly 290 during operation of the gas turbine engine 100. However, the composite structure described above may be used to form a sufficiently lightweight and rigid central spar 282 and/or the remainder of airfoil assembly 290.

In this regard, as illustrated, first helical support structure 230 and second helical support structure 232 may be positioned within outer skin 280 to define an outer boundary of central spar 282. It should be appreciated that first helical support structure 230 and second helical support structure 232 may be formed to create central spar 282 having any suitable size, shape, geometry, etc. In addition, polymeric matrix material 260 may be positioned around or encapsulate first helical support structure 230 and second helical support structure 232. Outer skin 280 (e.g., which may be similar to the blade skin 212) may be wrapped around first helical support structure 230 and second helical support structure 232 to define an outer boundary of central spar 282. As used herein, the terms "outer skin" and the like may be used to refer to blade skin 212 (e.g., when reinforcement structure 210 is used to form airfoil 214) or outer skin 280 (e.g., when reinforcement structure 210 is used to form central spar 282). According to exemplary embodiments, airfoil 214 may be formed in the same manner as described above and may be attached to a central spar 282 in any suitable manner to complete the formation of airfoil assembly 290.

Figure 7:
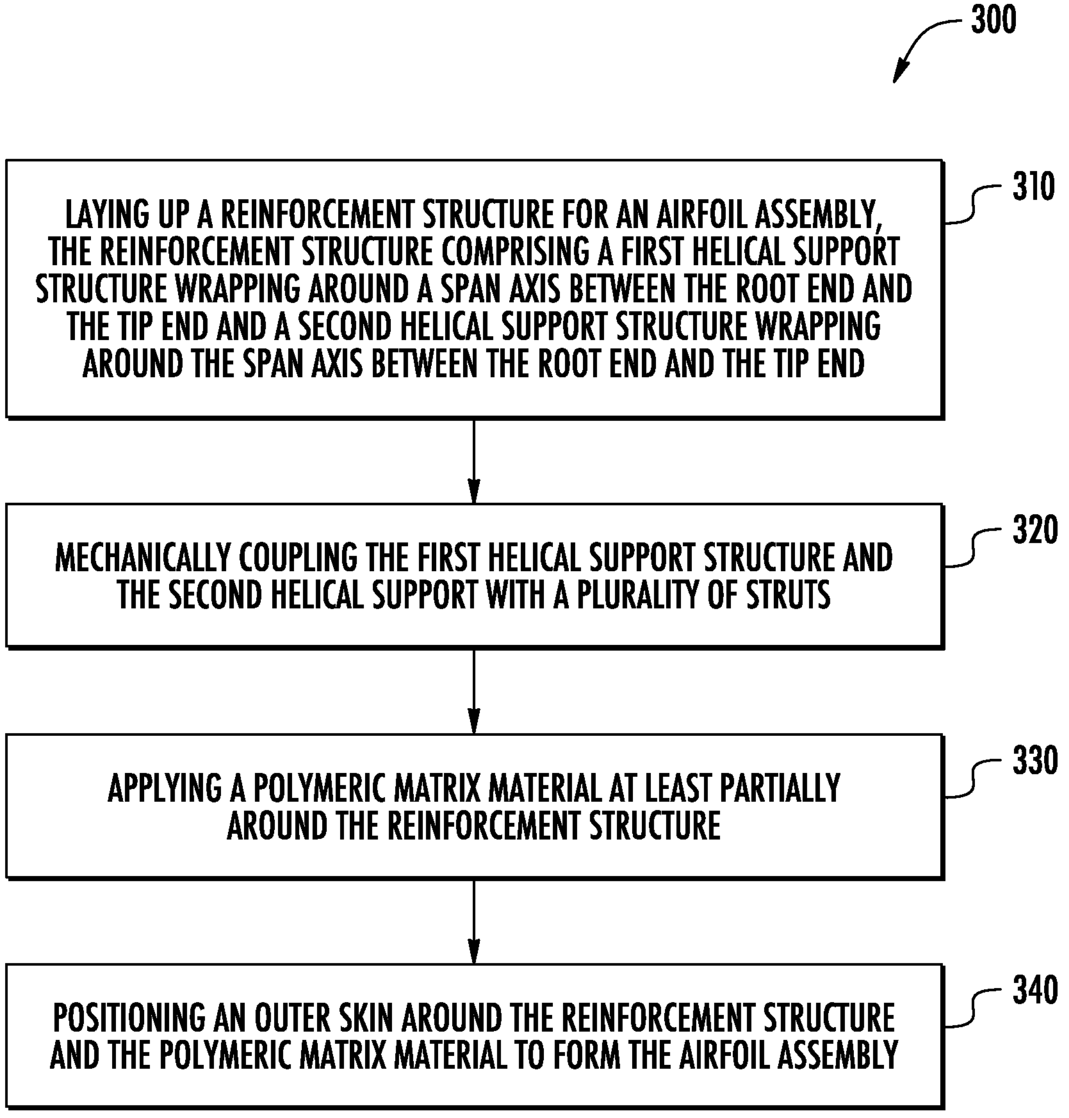
FIG. 7 provides a flowchart diagram of an exemplary method of manufacturing an airfoil assembly in accordance with an exemplary embodiment of the present disclosure.

Referring now to FIG. 7, an exemplary method 300 for constructing an airfoil assembly will be described according to exemplary embodiments of the present subject matter. For example, method 300 may be used to construct airfoil assembly 200 as described above. However, it should be appreciated that aspects of method 300 may be applied to the construction of any other suitable airfoil. In addition, it should be appreciated that alterations and modifications may be made to method 300 while remaining within scope of the present subject matter.

Method 300 may include, at step 310, laying up a reinforcement structure comprising a first helical support structure wrapping around a span axis of the airfoil assembly between a root end and a tip end and the second helical support structure wrapping around the span axis between the root end and the tip end. In this regard, continuing the example above, step 310 may include forming reinforcement structure 210 using first helical support structure 230 and second helical support structure 232. Step 320 may include mechanically coupling the first helical support structure and the second helical support structure with a plurality of struts. As explained above these struts may include turn connectors and/or helix connectors. It should be appreciated that the reinforcement structure described above may be manufactured in any suitable manner, such as via additive manufacturing.

Step 330 may generally include applying a polymeric matrix material at least partially surrounded reinforcement structure and step 340 may include positioning an outer skin around the reinforcement structure and polymer matrix material to form the airfoil assembly (or central spar). As explained above, steps 310 through 340 may be used to form all or any portion of airfoil assembly 200. For example, reinforcement structure 210, polymeric matrix material 260, and outer skin 280 may be used to form a central spar 282 of airfoil assembly 200. In addition, or alternatively, reinforcement structure 210, polymeric matrix material 260, and blade skin 212 may be used to form airfoil 214 of airfoil assembly 200.

In general, method 300 may include additional steps for improving the rigidity or performance of the airfoil assembly. For example, method 300 may include applying an adhesive at one or more stages of the manufacturing process, may include the formation of any other suitable number of helical support structures or support struts, etc. Other variations and modifications to airfoil assembly 200 and to method 300 of forming airfoil assembly 200 are possible and within the scope of the present subject matter.

FIG. 7 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using airfoil assembly 200 as an example, it should be appreciated that this method may be applied to the construction of any other suitable airfoil for any other suitable application.

Further aspects are provided by the subject matter of the following clauses:

An airfoil assembly defining a span axis, a root end, and a tip end, the airfoil assembly comprising: a reinforcement structure comprising a first helical support structure wrapped around the span axis between the root end and the tip end and a second helical support structure wrapped around the span axis between the root end and the tip end; a polymeric matrix material positioned at least partially around the reinforcement structure; and an outer skin positioned around the reinforcement structure and the polymeric matrix material.

The airfoil assembly of any preceding clause, wherein the reinforcement structure further comprises: a plurality of struts mechanically coupling the first helical support structure to the second helical support structure.

The airfoil assembly of any preceding clause, wherein the plurality of struts comprises: a plurality of turn connectors that extend between and mechanically couple adjacent turns of the first helical support structure or the second helical support structure.

The airfoil assembly of any preceding clause, wherein the plurality of struts comprises: a plurality of helix connectors that extend between and mechanically couple the first helical support structure to the second helical support structure.

The airfoil assembly of any preceding clause, wherein the plurality of struts extends substantially along the span axis or substantially along a chordwise direction.

The airfoil assembly of any preceding clause, wherein the plurality of struts are spaced about a perimeter of the first helical support structure and the second helical support structure.

The airfoil assembly of any preceding clause, wherein the first helical support structure defines a first wire diameter and the second helical support structure defines a second wire diameter, and wherein at least one of the first wire diameter or the second wire diameter varies along the span axis.

The airfoil assembly of any preceding clause, wherein the first helical support structure defines a first helix pitch and the second helical support structure defines a second helix pitch, and wherein at least one of the first helix pitch or the second helix pitch varies along the span axis.

The airfoil assembly of any preceding clause, wherein the first helical support structure wraps clockwise around the span axis and the second helical support structure wraps counterclockwise around the span axis.

The airfoil assembly of any preceding clause, wherein the first helical support structure and the second helical support structure are concentric.

The airfoil assembly of any preceding clause, wherein the polymeric matrix material encapsulates the reinforcement structure and bonds the reinforcement structure to the outer skin.

The airfoil assembly of any preceding clause, wherein the first helical support structure and the second helical support structure comprise at least one of metal, metal fibers, shape-memory alloys, carbon materials, aramids, functionally graded materials (FGMs), or carbon nano fibers.

The airfoil assembly of any preceding clause, wherein the first helical support structure and the second helical support structure are formed from different materials.

The airfoil assembly of any preceding clause, wherein the first helical support structure and the second helical support structure are additively manufactured as a single, integral piece.

The airfoil assembly of any preceding clause, wherein the reinforcement structure, the polymeric matrix material, and the outer skin form a central spar of the airfoil assembly.

The airfoil assembly of any preceding clause, wherein the outer skin is a blade skin that defines an airfoil that has a pressure side and a suction side.

The airfoil assembly of any preceding clause, wherein the reinforcement structure defines an inner cavity, and wherein the airfoil assembly further comprises: a foam filling the inner cavity, the foam comprising at least one of a polymethacrylimide (PMI) foam, a urethane foam, or a cast syntactic foam.

A method of manufacturing an airfoil assembly, the airfoil assembly defining a span axis, a root end, and a tip end, the method comprising: laying up a reinforcement structure comprising a first helical support structure wrapped around the span axis between the root end and the tip end and a second helical support structure wrapped around the span axis between the root end and the tip end; applying a polymeric matrix material at least partially around the reinforcement structure; and positioning an outer skin around the reinforcement structure and the polymeric matrix material to form the airfoil assembly.

The method of any preceding clause, further comprising: mechanically coupling the first helical support structure and the second helical support structure with a plurality of struts.

The method of any preceding clause, wherein the first helical support structure and the second helical support structure are additively manufactured as a single, integral piece This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An airfoil assembly defining a span axis, a root end, and a tip end, the airfoil assembly comprising:

a reinforcement structure comprising a first helical support structure fully wrapped around the span axis between the root end and the tip end and a second helical support structure fully wrapped around the span axis between the root end and the tip end, wherein the first helical support structure defines a first wire diameter and the second helical support structure defines a second wire diameter, and wherein at least one of the first wire diameter or the second wire diameter varies along the span axis;

a polymeric matrix material positioned at least partially around the reinforcement structure; and an outer skin positioned around the reinforcement structure and the polymeric matrix material.

2. The airfoil assembly of claim 1, wherein the reinforcement structure further comprises:

a plurality of struts mechanically coupling the first helical support structure to the second helical support structure.

3. The airfoil assembly of claim 2, wherein the plurality of struts comprises:

a plurality of turn connectors that extend between and mechanically couple adjacent turns of the first helical support structure or the second helical support structure.

4. The airfoil assembly of claim 2, wherein the plurality of struts comprises:

a plurality of helix connectors that extend between and mechanically couple the first helical support structure to the second helical support structure.

5. The airfoil assembly of claim 2, wherein the plurality of struts extends substantially along the span axis or substantially along a chordwise direction.

6. The airfoil assembly of claim 2, wherein the plurality of struts are spaced about a perimeter of the first helical support structure and the second helical support structure.

7. The airfoil assembly of claim 1, wherein the first helical support structure defines a first helix pitch and the second helical support structure defines a second helix pitch, and wherein at least one of the first helix pitch or the second helix pitch varies along the span axis.

8. The airfoil assembly of claim 1, wherein the first helical support structure wraps clockwise around the span axis and the second helical support structure wraps counterclockwise around the span axis.

9. The airfoil assembly of claim 1, wherein the first helical support structure and the second helical support structure are concentric.

10. The airfoil assembly of claim 1, wherein the polymeric matrix material encapsulates the reinforcement structure and bonds the reinforcement structure to the outer skin.

11. The airfoil assembly of claim 1, wherein the first helical support structure and the second helical support structure comprise at least one of metal, metal fibers, shape-memory alloys, carbon materials, aramids, functionally graded materials (FGMs), or carbon nano fibers.

12. The airfoil assembly of claim 1, wherein the first helical support structure and the second helical support structure are formed from different materials.

13. The airfoil assembly of claim 1, wherein the first helical support structure and the second helical support structure are additively manufactured as a single, integral piece.

14. The airfoil assembly of claim 1, wherein the reinforcement structure, the polymeric matrix material, and the outer skin form a central spar of the airfoil assembly.

15. The airfoil assembly of claim 1, wherein the reinforcement structure defines an inner cavity, and wherein the airfoil assembly further comprises:

a foam filling the inner cavity, the foam comprising at least one of a polymethacrylimide (PMI) foam, a urethane foam, or a cast syntactic foam.

16. A method of manufacturing an airfoil assembly, the airfoil assembly defining a span axis, a root end, and a tip end, the method comprising:

laying up a reinforcement structure comprising a first helical support structure fully wrapped around the span axis between the root end and the tip end and a second helical support structure fully wrapped around the span axis between the root end and the tip end, wherein the first helical support structure wraps clockwise around the span axis and the second helical support structure wraps counterclockwise around the span axis;

applying a polymeric matrix material at least partially around the reinforcement structure; and positioning an outer skin around the reinforcement structure and the polymeric matrix material to form the airfoil assembly.

17. The method of claim 16, further comprising:

mechanically coupling the first helical support structure to the second helical support structure with a plurality of struts.

18. The method of claim 16, wherein the first helical support structure and the second helical support structure are additively manufactured as a single, integral piece.

19. An airfoil assembly defining a span axis, a root end, and a tip end, the airfoil assembly comprising:

a reinforcement structure comprising a first helical support structure wrapped around the span axis between the root end and the tip end and a second helical support structure wrapped around the span axis between the root end and the tip end, the reinforcement structure further comprising a plurality of struts mechanically coupling the first helical support structure to the second helical support structure, the plurality of struts comprising a plurality of turn connectors that extend between and mechanically couple adjacent turns of the first helical support structure or the second helical support structure;

a polymeric matrix material positioned at least partially around the reinforcement structure; and an outer skin positioned around the reinforcement structure and the polymeric matrix material.

20. The airfoil assembly of claim 19, wherein the first helical support structure and the second helical support structure are formed from different materials.

* * * * *